Aug. 30, 1938. F. O. CONILL Re. 20,839

APPARATUS FOR THE WAVING OF THE HAIR

Original Filed June 15, 1932 3 Sheets-Sheet 1

Inventor
Fernan O. Conill

By Semmes & Semmes
Attorneys

Aug. 30, 1938. F. O. CONILL Re. 20,839

APPARATUS FOR THE WAVING OF THE HAIR

Original Filed June 15, 1932 3 Sheets-Sheet 2

Inventor
Fernan O. Conill

By Semmes & Semmes
Attorney

Aug. 30, 1938. F. O. CONILL Re. 20,839

APPARATUS FOR THE WAVING OF THE HAIR

Original Filed June 15, 1932 3 Sheets-Sheet 3

Inventor
Fernan Oscar Conill

By Semmes & Semmes
Attorneys

Reissued Aug. 30, 1938

Re. 20,839

UNITED STATES PATENT OFFICE 20,839

APPARATUS FOR THE WAVING OF THE HAIR

Fernan Oscar Conill, New York, N. Y.

Original No. 1,979,531, dated November 6, 1934, Serial No. 617,377, June 15, 1932. Application for reissue August 18, 1936, Serial No. 96,705. In France November 27, 1931

19 Claims. (Cl. 132—36)

The present invention relates to apparatus for the waving of the hair, more particularly for the so-called permanent waving of the hair. The object of the invention is to simplify the known apparatus used for this purpose and to reduce as much as possible the time required for the waving operation.

The invention employs at least two clamping members, hereinafter called the heater and the presser which clamp between them a lock of hair in a similar manner as the jaws of a curling iron. The characteristic feature of the invention consists in that both the heater and the presser are provided with perforations upon their clamping surfaces and that steam is circulated through the heater and the presser in series so that it issues through the perforations of the heater, passes through the lock of hair, then enters the presser through the perforations provided therein and is drawn away from the latter. The passing of the steam in series through the heater, the hair and the presser has the important advantage that no steam or moisture can reach the scalp as the steam issuing from the heater is sucked in by the presser. The heater is in communication with a source supplying steam, which may be additionally heated on the way to the heater and also by a heating device arranged within the heater, and the presser is in continuous communication with a source of suction, for instance, a fan. When the supply of steam to the heater is stopped, air is drawn into the presser and this air current cools and dries the hair.

In one construction several heaters and pressers are used which are mounted in a row in a manner similar to the teeth of a comb, the pressers alternating with the heaters. The pressers are movable to and fro between the heaters so that each presser can co-operate alternately with the two adjacent heaters. In this construction it is not necessary to wind the hair locks around the heaters as in most permanent hair waving apparatus. It is sufficient to insert the comb comprising the heaters and pressers into the hair as near as possible to the scalp, produce waves in the locks caught between the heaters and pressers by bringing the heaters and pressers into contact and passing steam through them and the locks, then change the relative position of the heaters and pressers and shift the comb along the locks and produce another set of waves in the opposite direction some further distance away from the scalp and the previous set of waves, and so on, sliding the comb along the locks until the whole required number of waves is produced upon the whole length of hair.

In another construction, one heater co-operates with two pressers which are pressed simultaneously against the two sides of the heater and the hair lock is wound upon the heating member in any known manner, but preferably in the manner used in the making of a so-called flat wave, in which the lock is wound upon a tubular rod from the tip to the root, the coils lying not side by side, but upon each other.

The heaters and pressers are of course both hollow, and either one or both are provided with internal electric heating means.

The acompanying drawings show by way of example two constructions embodying the features of the invention.

Fig. 1 indicates diagrammatically the action of a number of heating members and pressing members upon locks of hair.

Figure 1:
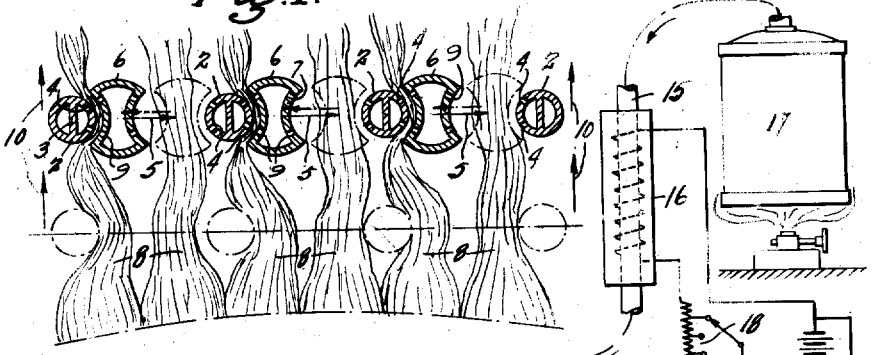

Referring to the drawings, Fig. 1 illustrates the manner in which a heating member co-operates with a pressing member. The heating members 2 are cylindrical bodies provided with an internal partition wall 3 (see also Fig. 2) and with a considerable number of small perforations 4. The heating members are arranged in a row, and between them are arranged reciprocable pressing members 6 which are also provided with perforations 9 adapted to register with the perforations 4 and have concave operating faces 7, the curvature of which corresponds to the curvature of the operating faces of the heating members, whereby locks of hair 8 may be firmly gripped and pressed between a heating member 2 and a co-operating pressing member 6, and steam may be passed from the interior of a heating member and through the orifices 4 and 9 into the interior of the pressing member 6 from which it is withdrawn by suction. The pressing members 6 receive a reciprocating movement as indicated by the arrow 5 in Fig. 1, so that they co-operate alternately each with the pressing member on its left and then with the pressing member on its right. After the locks have been acted upon on one side during a time sufficient for the drying of the hair, the pressing members 6 are moved say from the left to the right into the position indicated by dotted lines and the locks are then acted upon on the other side until they are sufficiently dry. The apparatus is then lifted in the direction of the arrow 10 and the locks are treated upon the next following points on which a wave is to be produced and so on until the whole lengths of the locks are waved. It will thus be seen that the locks may be very rapidly waved and dried without the necessity of winding them upon curlers and without any danger to the scalp.

Figure 2:
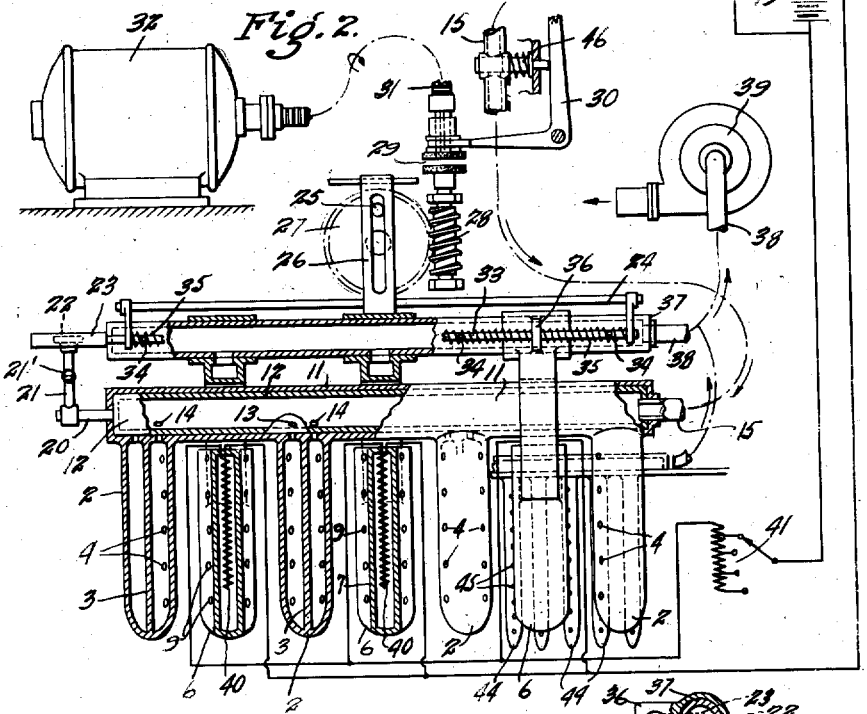
Fig. 2 is a diagram showing the various parts of the first construction of hand operated apparatus in which several heating members and pressing members are used, also a motor, a fan, and a steam producing apparatus used in conjunction with the hand operated apparatus.
Figure 3:
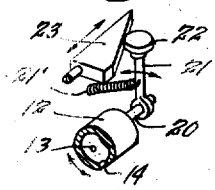
Fig. 3 shows perspectively a detail of the hand operated apparatus namely, means for operating a steam distributing valve associated with the heating members.

Fig. 2 shows diagrammatically the various parts of the apparatus, more particularly the arrangement of the heating members and the pressing members upon a common casing, their operation, and the means for supplying steam to the heating members and for drawing out the steam from the locks and through the pressing members.

As may be seen from Fig. 2, the heating members 2 are mounted upon a common cylindrical base 11 which is constructed as a valve casing and contains an internal corresponding cylindrical valve member 12 formed with distributing holes 13 and 14 for supplying with steam alternately the left and the right hand portions of the heating members 2. The interior of the valve member 12 is supplied with steam by means of a pipe 15 from a boiler 17, an electrical steam superheater 16 being interposed in the pipe 15 for the purpose of superheating or drying the steam. The superheater 16 is supplied with electric current from any suitable source 19, the amount of current supplied being regulable by means of an electric resistance 18. The valve member 12 is rotated by means of an outwardly projecting spindle 20 which carries an arm 21 controlled by a spring 21'. The arm carries upon its end an anti-friction roller 22 upon which acts a cam 23 carried by a reciprocating member 24. The latter is adapted to be reciprocated by a pin 25 adapted to slide in a slotted arm 26 of the member 24. The pin 25 is carried by a rotating disc 27 which carries a worm wheel and is actuated by a rotating screw 28. The latter receives its movement from a flexible shaft 31 of an electric or other motor 32, a clutch 29 being interposed between the screw 28 and the flexible shaft 31, said clutch 29 being operable by means of a lever and knob 30.

Figure 4:
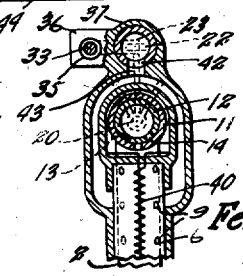
Fig. 4 is a fragmentary axial section through a pressing member.

The reciprocable member 24 is connected with a rod 33 which carries projections 34 and a number of springs 35 arranged between these projections. The springs bear against lateral lugs 36 of the pressing members 6 (Figs. 2 and 4). The projections or pins 34 of the reciprocating rod 33 serve for reciprocating the pressing members, and the object of the interposed springs 35 is to compensate for the uneven thickness of the locks so that the pressing members may when moved simultaneously by the rod 33 exert yielding pressures upon the locks interposed between the pressing members and the heating members. As may be seen from Figs. 2 and 4, the pressing members 6 are slidably mounted upon their upper ends upon a tube 37, the interior of which is in communication by means of a pipe 38 with an air exhaust fan 39 or other device for producing under-pressure within the pressing members.

Each pressing member 6 is fitted with an electric heating resistance 40 which are supplied with electric current from the source 19, a regulating resistance 41 being interposed. The heating resistances 40 serve to avoid condensation of steam within the pressing members. The tube 37 (Fig. 4) upon which the pressing members 6 slide to and fro is provided with openings 42 which register with corresponding openings 43 of the heating members 2, whereby the heating members are in continuous communication with the fan 39 or other vacuum producing device.

The apparatus is provided with a comb 44 (see Fig. 5) having hollow teeth 44 formed with a considerable number of perforations 45. These teeth are likewise in communication with the vacuum tube 38 and they serve for dividing the hair into a number of locks of substantially the same thickness, and also for cooling the hair and the scalp by the action of the air drawn through the comb.

The operation of this construction of the invention is as follows:—

Figure 5:
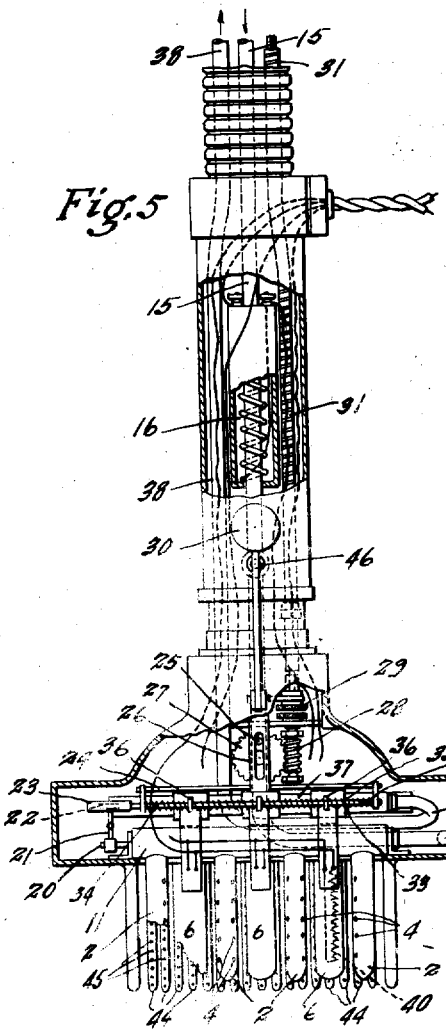
Fig. 5 is a top view partly in section, of the hand operated apparatus.
Figure 6:
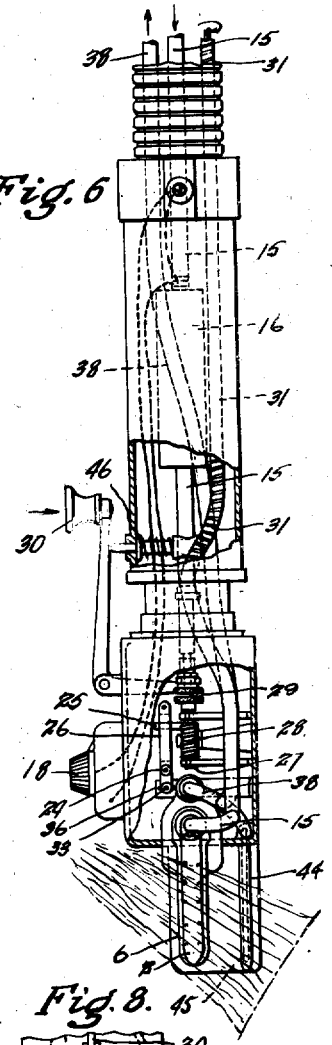
Fig. 6 is a side view corresponding to Fig. 5.
Figure 7:
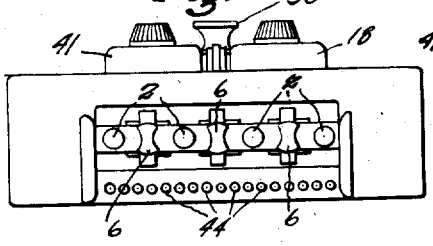
Fig. 7 is a front view corresponding to Fig. 5.
Figure 8:
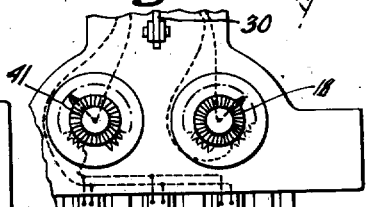
Fig. 8 is a top view of the front portion of the casing showing regulating resistances.

The apparatus shown in Figs. 5 and 6 is inserted into the hair as near as possible to the scalp in a manner similar to a comb so that the comb 44 lies flat and tangentially or at a slight angle to the scalp and a certain amount of hair is caught between the pressers 2 and the heaters 6, the pressers being in their middle positions between the heaters. The apparatus is gripped and held with one hand only, the thumb resting upon the knob of the lever 30 to manipulate the lever as required. As the apparatus is somewhat heavy, it may, if required, be suspended from the ceiling by means of an elastic cord. The operator has the other hand free and he can therefore if necessary by means of an ordinary comb hold securely the hair caught between the heaters and pressers should there be any tendency for same to come out of the apparatus. It will therefore be understood that in Fig. 5 the portion of the scalp treated may be assumed to lie approximately in the plane of the drawings underneath the comb 44, and the hair may be assumed to be held in a position at right angles to the plane of the drawings between the heaters and the pressers. The hair is, of course, further divided between the heaters and pressers and the scalp by the comb 44, but the position of the locks is determined by the heaters and pressers only and not by the comb. The operator then presses upon the lever 30 whereby the clutch 29 is thrown in and the reciprocable member 24 carrying the pressers 6 is moved say to the right as far as possible so as to clamp the hair between the pressers 6 and the heaters 2 located on the right hand side of the pressers. The hair located between the pressers and the heaters on the left hand sides of the pressers is not clamped at this stage. The valve 46 controlling the pipe 15 is then opened and steam is caused to enter the valve member 12 through the latter into the left hand compartment of the heaters 2, the clamped locks and the co-operating pressers, escaping from the latter into the fan 39.

It may be pointed out that preferably the fan is working continuously all the time, as well as the heating resistances. In this position the apparatus may be kept by disengaging the clutch 29 any desired length of time, which depends upon the nature of the hair treated and other circumstances. The locks are, of course, gripped with yielding pressure owing to the provision of springs 34. The clutch 29 is then again thrown in and the pressers are moved to the left. At the same time the whole apparatus is shifted, preferably upwardly so as to slide relatively to the hair and grip the hair clamped between the pressers and heaters at a point further remote from the scalp.

It will be seen that at this stage the hair lying between the heaters and the pressers on the left of the heaters will be clamped and treated, whilst the hair previously treated between the pressers and the heaters on the right sides of the pressers will be somewhat released. As the pressers are all the time in connection with the suction, it will be understood that the hair which has just been waved between the pressers and the right hand heaters and has been slightly released, will at the same time be cooled and dried by the air sucked into the pressers. Therefore, hair on one side of the presser will be waved and hair on the other side of the presser will be simultaneously cooled and dried. It will also be understood that the steam issues from the heater only on the side of the heater which is in clamping co-operation with the presser, inasmuch as at the end of each stroke of the part 24 carrying the pressers, the valve 12 which controls the supply of steam to the two compartments of each heater is turned into the required position. It will also be understood that the hair and the scalp are during the whole operation cooled by the action of the perforated comb 44 which is continuously in communication with the suction.

The rod 24 moves the pressing member 6 against the heating members 2 by means of the rod 33, the pin 34 and the spring 35, the latter acting upon lugs 36 of the heaters.

Figure 9:
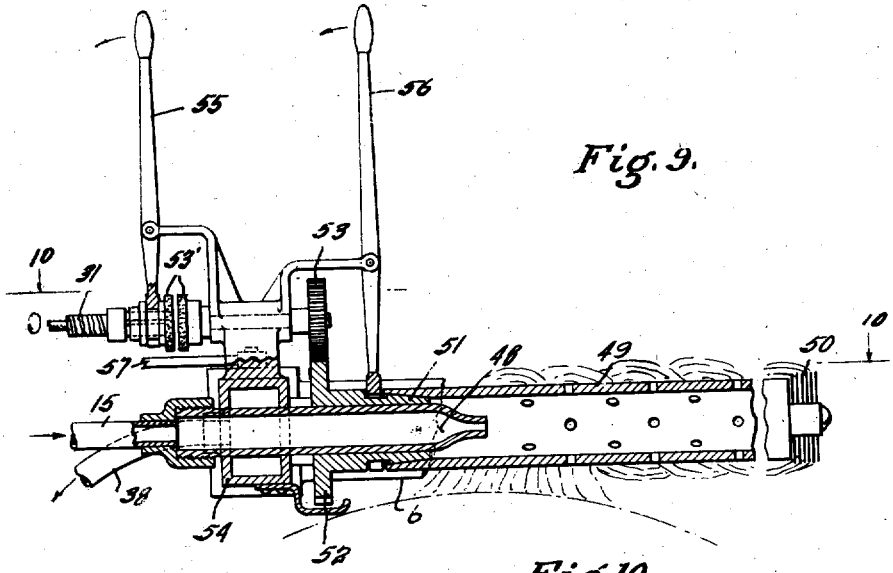
Fig. 9 is a sectional elevation of the second construction of the hand operated apparatus in which also one heating member and two pressing members are used.
Figure 10:
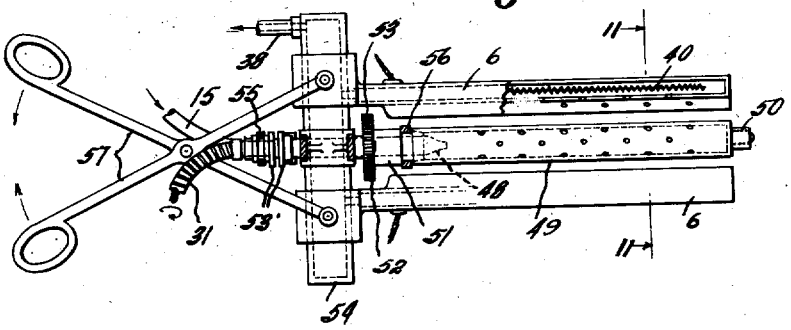
Fig. 10 is a plan corresponding to Fig. 9.
Figure 11:
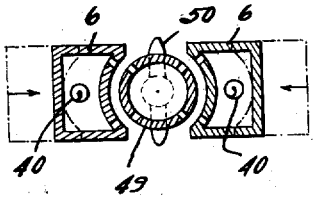
Fig. 11 is a cross section through the heating and pressing members of Fig. 10.

Figs. 9 to 11 show a construction in which a heating member which serves also as a curler co-operates with two pressing members. In this construction 49 indicates a hollow curler mounted upon a socket 51 which is adapted to receive a rotary movement by means of a gear 52 carried by the socket and a gear 53 adapted to be rotated through a friction clutch 53' from a flexible driving shaft 31. The friction clutch is operable by means of a hand lever 55. The curler carries upon its outer end a comb 50 which grips the lock. The lock is then wound by the rotation of the tube 49 upon the latter very rapidly. As soon as the lock is wound upon the tube, the resistance offered by the hair stops further rotation of the tube 49 and the friction clutch no longer transmits movement from the shaft 31 to the tube. At the same moment, steam is introduced through the nozzle 48 into the tube 49 and the pressing members 6 and from the latter into the fan or other vacuum producing device. The members 6, as in the previous constructions, are connected by a tube 38 with a vacuum producing device and the pressing members 6 may be actuated by means of levers 57 which are connected together after the manner of the arms of scissors. The pressing members 6 are slidably mounted upon a tubular member 54. After a sufficient time has elapsed the operator stops the steam supply and moves a lever 56 to remove the tube 49 from the socket 51, whereupon a fresh tube may be inserted upon the socket and a fresh lock waved.

It will be understood that the invention is not limited to the construction shown and that various modifications may be made within the scope of the invention.

I claim:

1. In apparatus for the waving of hair the combination of: a perforated tubular heating member; two perforated tubular pressing members adapted to cooperate with said heating member; means for circulating steam through a heating member and a pressing member so as to pass through the perforations of these members and a hair lock located between the members; and means for firmly pressing a pressing member against the heating member, substantially as described.

2. In apparatus for the waving of hair, the combination of: a perforated tubular heating member provided with a longitudinal internal partition; two perforated tubular pressing members adapted to cooperate alternately with the said heating member; and means for circulating steam alternately between the left hand inner space of the heating member and the corresponding left hand pressing member and between the right hand internal space of the heating member and the corresponding right hand pressing member; and means for alternately pressing the two pressing members against the heating member, substantially as described.

3. In apparatus for the waving of hair, the combination of: a perforated tubular heating member, adapted to be used as a curler for winding a lock of hair thereon; two perforated tubular pressing members adapted to cooperate with said heating member; and means for circulating steam through the said heating member and the said two pressing members so as to pass through the perforations of these members and a hair lock wound upon the heating member, substantially as described.

4. In apparatus for the waving of hair, the combination of: a perforated tubular heating member; two perforated tubular pressing members adapted to cooperate with said heating member; means for circulating steam through the heating member and the pressing members so as to pass through the perforations of these members and a hair lock located between the members; and electric means for superheating the steam before passing through the said members, substantially as described.

5. In apparatus for the waving of hair the combination of: a perforated tubular heating member; two perforated tubular pressing members adapted to cooperate with said heating member; means for circulating steam through a heating member and a pressing member so as to pass through the perforations of these members and a hair lock located between the members; and internal electric heating resistances provided in the said pressing members, substantially as described.

6. In apparatus for the waving of hair the combination of: a perforated tubular heating member; two perforated tubular pressing members adapted to cooperate with said heating member; means for circulating steam through a heating member and a pressing member so as to pass through the perforations of these members and a hair lock located between the members, said circulating means comprising a suction producing fan, substantially as described.

7. In apparatus for the waving of hair the combination of: a number of heating members and pressing members arranged in one row, the heating members alternating with the pressing members; power operated means for alternately moving the heating members and the pressing members relatively to each other first in the one and then in the other direction; and automatic means for alternately passing steam between the left and right hand portions of the heating members and the corresponding pressing members, substantially as described.

8. In apparatus for the waving of hair, the combination of: a perforated tubular heating member; two perforated tubular pressing members adapted to cooperate with said heating member; means for circulating steam through a heating member and a pressing member so as to pass through the perforations of these members and a hair lock located between the members; means for firmly pressing a pressing member against a heating member; a comb having perforated teeth; and means for drawing air through the teeth of the comb for the purpose of cooling the hair and the scalp, substantially as described.

9. In apparatus for the waving of hair, the combination of: a perforated tubular heating member; two perforated tubular pressing members adapted to cooperate simultaneously with said tubular heating member; means for circulating steam through said heating member and through said pressing members so as to pass through the perforation of these members and a hair lock located upon the heating member; and power operated means for rotating the heating member for the purpose of winding a hair lock thereon, substantially as described.

10. In an apparatus for waving hair, a curling member, means to rotate the curling member to wind a lock of hair thereon, means to stop the rotating means when the hair is wound upon the curling member, and means to heat the lock of hair.

11. In an apparatus for waving hair, a curling member, power actuated means to rotate the curling member to wind a lock of hair thereon, means to disconnect the power actuated means from the curling member when the hair is wound upon the curling member, and means to heat the lock of hair.

12. In an apparatus for waving hair, a curling member, power actuated means to rotate the curling member to wind a lock of hair thereon, a clutch associated with the power actuated means and the curling member for disconnecting the power actuated means from the curling member when the hair is wound upon said member, and means to heat the lock of hair.

13. In an apparatus for waving hair, a curling member, means to rotate the curling member to wind a lock of hair thereon, means to stop the rotating means when the hair is wound on the curling member, means for transmitting steam throughout the lock of hair, and means to superheat the steam prior to its transmission throughout the hair.

14. In an apparatus for waving hair, a curling member, means to rotate the curling member to wind a lock of hair thereon, clutch means to stop the rotating means when the hair is wound on the curling member, means for transmitting steam throughout the lock of hair, and electrical means for superheating the steam prior to its transmission throughout the hair.

15. In apparatus for the waving of hair, the combination of a tubular heating member adapted to be used as a curler for winding a lock of hair thereon, a pair of tubular pressing members adapted to cooperate with said heating member, means for transmitting heat to a hair lock wound upon the heating member, and means for moving the pressing members to clamp the lock of hair between said members and the heating member.

16. In an apparatus for waving hair, the combination of a tubular heating member adapted to be used as a curler, a pair of tubular pressing members adapted to cooperate with said heating member, means to rotate the said heating member to wind a lock of hair thereon, means for conveying heat to the lock of hair wound upon the heating member, and means for moving the pressing members to clamp the lock of hair between said pressing members and the heating member.

17. In an apparatus for waving hair, the combination of a tubular heating member adapted to be used as a curler, a pair of tubular pressing members adapted to cooperate with said heating member, means to rotate said member to wind a lock of hair thereon, means to stop the rotating means when the hair is wound on the heating member, means for conveying heat to the lock of hair wound upon the heating member, and means for moving the pressing members to clamp the lock of hair between said pressing members and the heating member.

18. In an apparatus for waving hair, the combination of a tubular heating member adapted to be used as a curler, a pair of tubular pressing members adapted to cooperate with said heating member, power operated means for rotating said heating member to wind a lock of hair thereon, clutch means to disconnect said heating member from said power means when the lock of hair is wound upon the heating member, means for conveying heat to the lock of hair wound upon the heating member, and means for moving the pressing members to clamp the lock of hair between said members and the heating member.

19. In an apparatus for waving hair, a curling member, means to connect the curling member with a source of power for rotating the curling member to wind a curl of hair thereon, means to disconnect the curling member from the source of power when the hair is completely wound on the curler, means to heat the lock of hair and means to cool the hair and scalp during the whole waving operation.

FERNAN OSCAR CONILL.